(12) United States Patent
De Sapio et al.

(10) Patent No.: US 10,986,113 B2
(45) Date of Patent: Apr. 20, 2021

(54) SYSTEM FOR CONTINUOUS VALIDATION AND THREAT PROTECTION OF MOBILE APPLICATIONS

(71) Applicant: HRL Laboratories, LLC, Malibu, CA (US)

(72) Inventors: Vincent De Sapio, Westlake Village, CA (US); Hyun (Tiffany) J. Kim, Irvine, CA (US); Kyungnam Kim, Oak Park, CA (US); Nigel D. Stepp, Santa Monica, CA (US); Kang-Yu Ni, Calabasas, CA (US); Jose Cruz-Albrecht, Oak Park, CA (US); Braden Mailloux, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 210 days.

(21) Appl. No.: 16/199,128

(22) Filed: Nov. 23, 2018

(65) Prior Publication Data

US 2019/0230107 A1 Jul. 25, 2019

Related U.S. Application Data

(60) Provisional application No. 62/621,445, filed on Jan. 24, 2018.

(51) Int. Cl.
*G06F 11/00* (2006.01)
*G06F 12/14* (2006.01)
(Continued)

(52) U.S. Cl.
CPC .......... *H04L 63/1425* (2013.01); *G06F 21/50* (2013.01); *G06F 21/552* (2013.01);
(Continued)

(58) Field of Classification Search
CPC ............. H04L 63/1425; H04L 41/142; H04W 12/1204; H04W 12/1208; G06F 21/50; G06F 21/532; G06F 2221/034
See application file for complete search history.

(56) References Cited

U.S. PATENT DOCUMENTS 9,043,905 B1* 5/2015 Allen .................... G06F 21/552
726/22
9,479,357 B1 10/2016 Fu et al.
(Continued)

OTHER PUBLICATIONS

Notification of Transmittal of International Search Report and the Written Opinion of the International Searching Authority for PCT/US2018/062401; dated Mar. 5, 2019.
(Continued)

*Primary Examiner* — Darshan I Dhruv
(74) *Attorney, Agent, or Firm* — Tope-McKay & Associates

(57) ABSTRACT

Described is a low power system for mobile devices that provides continuous, behavior-based security validation of mobile device applications using neuromorphic hardware. A mobile device comprises a neuromorphic hardware component that runs on the mobile device for continuously monitoring time series related to individual mobile device application behaviors, detecting and classifying pattern anomalies associated with a known malware threat in the time series related to individual mobile device application behaviors, and generating an alert related to the known malware threat. The mobile device identifies pattern anomalies in dependency relationships of mobile device inter-application and intra-applications communications, detects pattern anomalies associated with new malware threats, and isolates a mobile device application having a risk of malware above a predetermined threshold relative to a risk management policy.

15 Claims, 14 Drawing Sheets
(2 of 14 Drawing Sheet(s) Filed in Color)

(51) Int. Cl.

| | |
|---|---|
| G06F 12/16 | (2006.01) |
| G08B 23/00 | (2006.01) |
| H04L 29/06 | (2006.01) |
| H04W 12/12 | (2021.01) |
| H04L 12/24 | (2006.01) |
| G06N 3/063 | (2006.01) |
| G06F 21/55 | (2013.01) |
| G06F 21/50 | (2013.01) |
| H04W 12/122 | (2021.01) |
| H04W 12/128 | (2021.01) |

(52) U.S. Cl.
CPC ........... *G06N 3/063* (2013.01); *H04L 41/142* (2013.01); *H04W 12/122* (2021.01); *H04W 12/128* (2021.01); *G06F 2221/034* (2013.01)

(56) References Cited

U.S. PATENT DOCUMENTS

| | | | | |
|---|---|---|---|---|
| 2012/0137367 | A1* | 5/2012 | Dupont | G06F 21/00 726/25 |
| 2013/0298244 | A1 | 11/2013 | Kumar et al. | |
| 2015/0128265 | A1* | 5/2015 | Jover | H04W 12/12 726/23 |
| 2015/0163121 | A1* | 6/2015 | Mahaffey | H04L 63/1425 707/687 |
| 2016/0021174 | A1* | 1/2016 | De Los Santos Vilchez | H04L 67/10 709/201 |
| 2016/0055190 | A1 | 2/2016 | Bar-Yam | |
| 2016/0154960 | A1* | 6/2016 | Sharma | G06F 21/577 726/25 |
| 2017/0004303 | A1* | 1/2017 | Yan | H04L 51/12 |
| 2017/0229117 | A1* | 8/2017 | van der Made | G06F 3/167 |
| 2017/0308505 | A1 | 10/2017 | Ni et al. | |
| 2017/0366562 | A1* | 12/2017 | Zhang | G06N 20/00 |
| 2018/0122368 | A1* | 5/2018 | Costello | G10L 25/63 |
| 2018/0165467 | A1* | 6/2018 | Yablokov | G06F 21/629 |
| 2018/0357446 | A1* | 12/2018 | Ferrara | G06F 21/552 |
| 2019/0007434 | A1* | 1/2019 | McLane | G06N 3/084 |
| 2019/0042920 | A1* | 2/2019 | Akin | G06N 3/063 |
| 2019/0056987 | A1* | 2/2019 | Busch | G06F 11/073 |
| 2019/0206391 | A1* | 7/2019 | Busch | G10L 15/16 |

OTHER PUBLICATIONS

International Search Report of the International Searching Authority for PCT/US2018/062401; dated Mar. 5, 2019.
Written Opinion of the International Searching Authority for PCT/US2018/062401; dated Mar. 5, 2019.
Guillermo Suarez et al., 'DroidSieve: Fast and Accurate Classification of Obfuscated Android Malware', In: CODASPY '17 Proceedings of the Seventh ACM on Conference on Data and Application Security and Privacy, Scottsdale, Arizona, USA, Mar. 22-24, 2017, ISBN: 978-1-4503-4523-1, pp. 309-320.
Armando, A. Merlo, M. Migliardi, and L. Verderame. Would You Mind Forking This Process? A Denial of Service Attack on Android (and Some Countermeasures). In Proceedings of IFIP, 2012, pp. 13-24.
E. Athanasopoulos, V. P. Kremerlis, G. Portokalidis, and A. D. Keromytis. NaClDroid: Native Code Isolation for Androic Applications. In Proceedings of ESORICS, 2016, pp. 1-17.
M. Bauer, M. Coatsworth, and J. Moeller. NANSA: A No-Attribution, No-Sleep Battery Exhaustion Attack for Portable Computing Devices, 2015, pp. 1-10.
T. Blasing, A.-D. Schmidt, L. Batyuk, S. A. Camtepe, and S. Albayarak. An Android Application Sandbox System for Suspicious Software Detection. In Proceedings of MALWARE, 2010, pp. 55-62.
A. Bose, X. Hu, K. G. Shin, and T. Park. Behavioral Detection of Malware on Mobile Handsets. In Proceedings of mobiSys, 2008, pp. 225-238.
T. K. Buennemeyer et al. Mobile Device Profiling and Intrusion Detection using Smart Batteries. In Proceedings of HICSS, 2008, pp. 1-10.
I. Burguera, U. Zurutuza, and S. Nadjm-Tehrani. Crowdroid: Behavior-Based Malware Detection System for Android. In Proceedings of SPSM, 2011, pp. 1-12.
E. Candes, X. Li, Y. Ma, and J. Wright, "Robust Principal Component Analysis?", IEEE PAMI 2011, pp. 1485-1494.
Cruz-Albrecht, J., Derosier, T., and Srinivasa, N. (2013) Scalable neural chip with synaptic electronics using CMOS integrated memristors, Nanotechnology, vol. 24, p. 384011 (11pp), 2013, Special Issue on Synaptic Electronics.
A. Desnos, and G. Gueguen. Android: From Reversing to Decompilation. In BlackHat, 2011, pp. 1-24.
W. Enck, P. Gilbert, B.-G. Chun, L. P. Cox, J. Jung, P. McDaniel, and A. N. Sheth. Taintdroid: An Information-Flow Tracking System for Real-time Privacy Monitoring on Smartphones. In Proceedings of OSDI, 2010, pp. 1-15.
P. Faruki, V. Ganmoor, V. Laxmi, M. S. Gaur, and A. Bharmal. AndroSimilar: Robust Statistical Feature Signature for Android Malware Detection. In Proceedings of SIN, 2013, pp. 152-159.
P. Faruki, A. Bharmal, V. Laxmi, V. Ganmoor, M. S. Gaur, and M. Conti. Android Security: A Survey of Issues, Malware Penetration and Defenses. IEEE Communications Surveys and Tutorials, 17(2), pp. 998-1022, Dec. 2014.
Y. Feng, S. Anand, I. Dilling, and A. Aiken. Apposcopy: Semantics-Based Detection of Android Malware through Static Analysis, In Proceedings of FSE, 2014, pp. 576-587.
Hammond, D.K., Vandergheynst, P. and Gribonval, R., 2011. Wavelets on graphs via spectral graph theory. Applied and Computational Harmonic Analysis, 30(2), pp. 129-150.
Hoffmann, H., Howard, M.D. and Daily, M.J., Jul. 2011, Fast pattern matching with time-delay neural networks. In the 2011 International Joint Conference on Neural Networks (IJCNN), pp. 2424-2429. IEEE.
H. Kim, J. Smith, and K.G. Shin. Detecting Energy-Greedy Anomalies and Mobile Malware Variants. In Proceedings of MobiSys, 2008, pp. 239-252.
M. Lindorfer, M. Neugschwandtner, L. Weichselbaum, Y. Fratantonio, V. van der Veen, and C. Platzer. ANDRUBIS—1,000,000 Apps Later: A View on Current Android Malware Behavior, In Proceedings of BADGERS, 2014, pp. 1-15.
W. Maass, T. Natschläger, H. Markram. Real-time computing without stable states: A new framework for neural computation based on perturbations. Neural computation, 14:11, pp. 2531-2560. Nov. 2002.
A. Merlo, M. Migliardi, and P. Fontanelli. On Energy-Based Profiling of Malware in Android. In Proceedings of HPCS, 2014, pp. 535-542.
Kang-Yu Ni and Tsai-Ching Lu, "Information Dynamic Spectrum Characterizes System Instability Toward Critical Transitions," EPJ Data Science, 3:28, 2014, pp. 1-25.
J. Oberheide and C. Miller. Dissecting the Android Bouncer, In SummerCon, 2012, pp. 1-62.
G. Portokalidis, P. Homburg, K. Anagnostakis, and H. Bos. Paranoid Android: Versatile Protection for Smartphones. In Proceedings of ACSAC, 2010, pp. 1-10.
V. Rastogi, Y. Chen, and X. Jiang. DroidChameleon: evaluating Android anti-malware against transformation attacks. In ASIACCS, pp. 329-334. ACM, 2013.
A. Reina, A. Fattori, L. Cavallaro. A System call-centric Analysis and Stimulation Technique to Automatically Reconstruct Android Malware Behaviors, In EuroSec, 2013, pp. 1-6.
H.T.T. Truong, E. Lagerspetz, P. Nurmi, A. J. Oliner, S. Tarkoma, N. Asokan and S. Bhattacharya. The Company you Keep: Mobile Malware Infection Rates and Inexpensive Risk Indicators. In Proceedings of WWW, 2014, pp. 39-49.
A.-D. Schmidt et al. Static Analysis of Executables for Collaborative Malware Detection on Android. In Proceedings of IEEE ICC, 2009, pp. 1-5.
A.-D. Schmidt, A. Camtepe, S. and Albayrak. Static Smartphone Malware Detection. In Proceedings of the 5th Security Research Conference, 2010, p. 1.

(56) References Cited

OTHER PUBLICATIONS

Thomas Schreiber, "Measuring Information Transfer", Phys. Rev. Lett. 85(2): pp. 461-464, 2000.

A. Shabtai, R. Moskovitch, Y. Elovici, and C. Glezer. Detection of Malicious Code by Applying Machine Learning Classifiers on Static Features: A State-of-the-Art Survey. In Inf. Secur. Tech. Rep., 14: pp. 16-29, Feb. 2009.

A. Shabtai, U. Kanonov, and Y. Elovici. Intrusion Detection for Mobile Devices using the Knowledge-based, Temporal Abstraction Method. Journal of Systems Software, 83, pp. 1524-1537, Aug. 2010.

A. Shabtai, U. Kanonov, Y. Elovici, C. Glezer, and Y. Weiss. Andromaly: A Behavioral malware Detection Framework for Android Devices. Journal of Intelligent Information Systems, pp. 1-30, 2011.

Srinivasa, N., and Cho, Y. K. (2014), Unsupervised Discrimination of Patterns in Spiking Neural Networks with Excitatory and Inhibitory Synaptic Plasticity, Frontiers in Computational Neuroscience, vol. 8, pp. 1-23.

Srinivasa, N., and Cho, Y. K. (2012), A Self-Organizing Spiking Neural Model for Learning Fault-Tolerant Spatio-Motor Transformations, IEEE Transactions on Neural Networks and Learning Systems, vol. 23, No. 10, pp. 1526-1538.

Thibeault, C. M., Harris, F. C., and Srinivasa, N. (2014), Using Games to Embody Spiking Neural Networks for Neuromorphic Hardware, International Journal of Computers and their Applications, vol. 21, No. 1, pp. 40-53.

R. Xu, H. Saidi, and R. Anderson. Aurasium: Practical Policy Enforcement for Android Applications. In Proceedings of USENIX Security, 2012, pp. 1-14.

L. K. Yan, and H. Yin. DroidSscope: Seamlessly Reconstructing the OS and Dalvik Semantic Views for Dynamic Android Malware Analysis. In Proceedings of USENIX Security, 2012, pp. 1-16.

X. Yan, Joy Y. Zhang. "Early Detection of Cyber Security Threats using Structured Behavior Modeling". ACM Transactions on Information and System Security, vol. V, No. N. 2013, pp. 1-19.

T. Zhou and D. Tao. "GoDec: Randomized low-rank & sparse matrix decomposition in noisy case." ICML 201, pp. 1-8.

O'Brien, M.J. and Srinivasa, N., 2013. A spiking neural model for stable reinforcement of synapses based on multiple distal rewards. Neural Computation, 25(1), pp. 123-156.

Notification of and the International Preliminary Report on Patentability Chapter II for PCT/US2018/062401; dated Nov. 27, 2019.

\* cited by examiner

| | Specifications |
|---|---|
| Number of Neurons | 576 |
| Number of Synapses | 9,216 |
| Number of input spike signals | Up to 96 |
| Spike rate | Biological (~50 Hz) |
| Number of time multiplexing Slots | 1-16 |
| Time Multiplexing Slot duration | 100us |
| Time Multiplexing Cycle duration | 100us – 1.6ms |
| Synapse weight resolution | 8 levels (3 bits) |
| Neuron Threshold level | 1024 levels |

FIG. 5

SYSTEM FOR CONTINUOUS VALIDATION AND THREAT PROTECTION OF MOBILE APPLICATIONS

CROSS-REFERENCE TO RELATED APPLICATIONS

This is a Non-Provisional application of U.S. Provisional Application No. 62/621,445, filed in the United States on Jan. 24, 2018, entitled, "System for Continuous Validation and Threat Protection of Mobile Applications," the entirety of which is incorporated herein by reference.

GOVERNMENT LICENSE RIGHTS

This invention was made with government support under U.S. Government Contract Number W911NF-16-C-0018. The government has certain rights in the invention.

BACKGROUND OF INVENTION

(1) Field of Invention

The present invention relates to a system for continuous monitoring of mobile applications and, more particularly, to a system for continuous monitoring of mobile applications using power efficient neuromorphic hardware.

(2) Description of Related Art

Existing state of the art (SOA) mechanisms to detect malware can be classified into static, dynamic/behavior, or hybrid analysis. Static analysis approaches inspect for suspicious patterns in the application's source code or binaries (see the List of Incorporated Literature References, Literature Reference Nos. 10, 12, 14, 27, 28, and 30). For example, most current Android anti-malware products use malware signatures to detect known malware. Although detection is fast and efficient, static analysis approaches are incapable of identifying zero-day vulnerabilities, and adversaries can easily circumvent these detections by simple program obfuscation (see Literature Reference No. 24).

Unlike static analysis, dynamic/behavior analysis approaches analyze the application's run-time behavior or temporal patterns by executing and monitoring it in the wild (see Literature Reference Nos. 5, 7, 11, 31, 32, and 36) or in a secure environment (e.g., SandBox, virtual cloud, emulator) (see Literature Reference No. 23, 25, and 37). Compared to static analysis, dynamic analysis can detect zero-day and sophisticated attacks. However, dynamic analysis approaches are complex and may require additional computational power and time for detection than static approaches, and hence these approaches oftentimes utilize external infrastructure (e.g., cloud) for analysis (see Literature Reference Nos. 7, 11, and 23).

Furthermore, SandBox approaches can easily miss some malicious execution paths if they are triggered by non-trivial events (e.g., at particular time of the day (see Literature Reference No. 13), and anti-emulation techniques (see Literature Reference No. 22) or if performing malicious activities with time delay (see Literature Reference No. 13) helps adversaries evade dynamic analysis. Finally, hybrid analysis is a combination of static and dynamic/behavior analyses to increase malware coverage while minimizing false alarms (see Literature Reference Nos. 4 and 18). For example, static analysis is applied first to detect known malware patterns, followed by dynamic analysis for further behavior-based analysis.

Malicious behavior in mobile devices involves either high-level or low-level information (see Literature Reference No. 25). High-level information includes permissions, actions, intents, strings in application programming interface (API) calls, commands, etc., while low-level operating system (OS)-specific semantics include file access, program execution, etc. Well-known attacks utilizing high-level information include: (1) permission misusage within an application, where an application misuses its permission privileges to transfer sensitive information to external entities, for example for monetary purposes, (e.g., Black Jack Free); (2) permission misusage by colluding with multiple applications, where apps collude with each other to gain access to forbidden permissions; and (3) turning a device into a bot (e.g., Android GM Bot) to launch malicious activities using instructions from an external command-and-control server.

Attacks utilizing low-level semantics include: (1) obfuscated malware, encrypting string, renaming string, inserting junk method, or changing control flows to evade detection methods; (2) native code leakage (see Literature Reference No. 2) that exploits vulnerable codes in third-party libraries that app developers use (3) exploiting vulnerabilities in the kernel, such as Denial-of-Service (DoS) attacks (see Literature Reference No. 1) to prevent users from launching needed applications, or privilege escalation attack such that apps bypass restrictions; and (4) function call misusage in kernel, such as a battery exhaustion attack (see Literature Reference No 3) that exploits system resources to hold the device in an active high-power state (i.e., no permission is needed) and forces other applications to do intensive work. Stealthy malware in both classes launches malicious activities after time delay (e.g., Beaver Gang Counter), selectively ceases operations, or disrupts malware analysis to evade analysis methods. Although these attacks are OS-agonistic, Android is used as an illustrative example due to its open source nature and significant market share.

Thus, a continuing need exists for a system continuously and reliably detect malware and security threats transparently and without burden to the user.

SUMMARY OF INVENTION

The present invention relates to a system for continuous monitoring of mobile applications and, more particularly, to a system for continuous monitoring of mobile applications using power efficient neuromorphic hardware. The system is a mobile device comprising a neuromorphic hardware component that runs continuously on the mobile device. The neuromorphic hardware component performs operations of continuously monitoring time series related to individual mobile device application behaviors; detecting and classifying pattern anomalies associated with a known malware threat in the time series related to individual mobile device application behaviors; and generating at least one alert related to the known malware threat.

The mobile device further comprises one or more processors and a non-transitory computer-readable medium having executable instructions encoded thereon, wherein the one or more processors perform operations of receiving the at least one alert related to the known malware threat from the neuromorphic hardware component in an associative transfer entropy (ATE) stage, identifying pattern anomalies in dependency relationships of mobile device inter-application and intra-applications communications using an ATE measure; in a zero-shot learning (ZSL) stage, detecting pattern anomalies associated with new malware threats using a ZSL component; and isolating a mobile device application having a risk of malware above a predetermined threshold relative to a risk management policy.

In another aspect, the mobile device filters out any false alarms of malware threats to prevent unnecessary isolation of mobile device applications in the ATE stage.

In another aspect, in detecting pattern anomalies associated with new malware threats, the mobile device uses the ZSL component for augmenting the ATE measure using semantic knowledge transfer.

In another aspect, the ZSL component transfers new malware threat knowledge among a plurality of mobile devices.

In another aspect, in identifying pattern anomalies in dependency relationships, the mobile device generates a network representation of mobile application behavior from an amount of directional information transfer between mobile device applications and effects of the directional information transfer obtained with the ATE measure.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 5 is a table illustrating specification of new version of a chip with 576 neurons according to some embodiments of the present disclosure;

DETAILED DESCRIPTION

Figure 1:
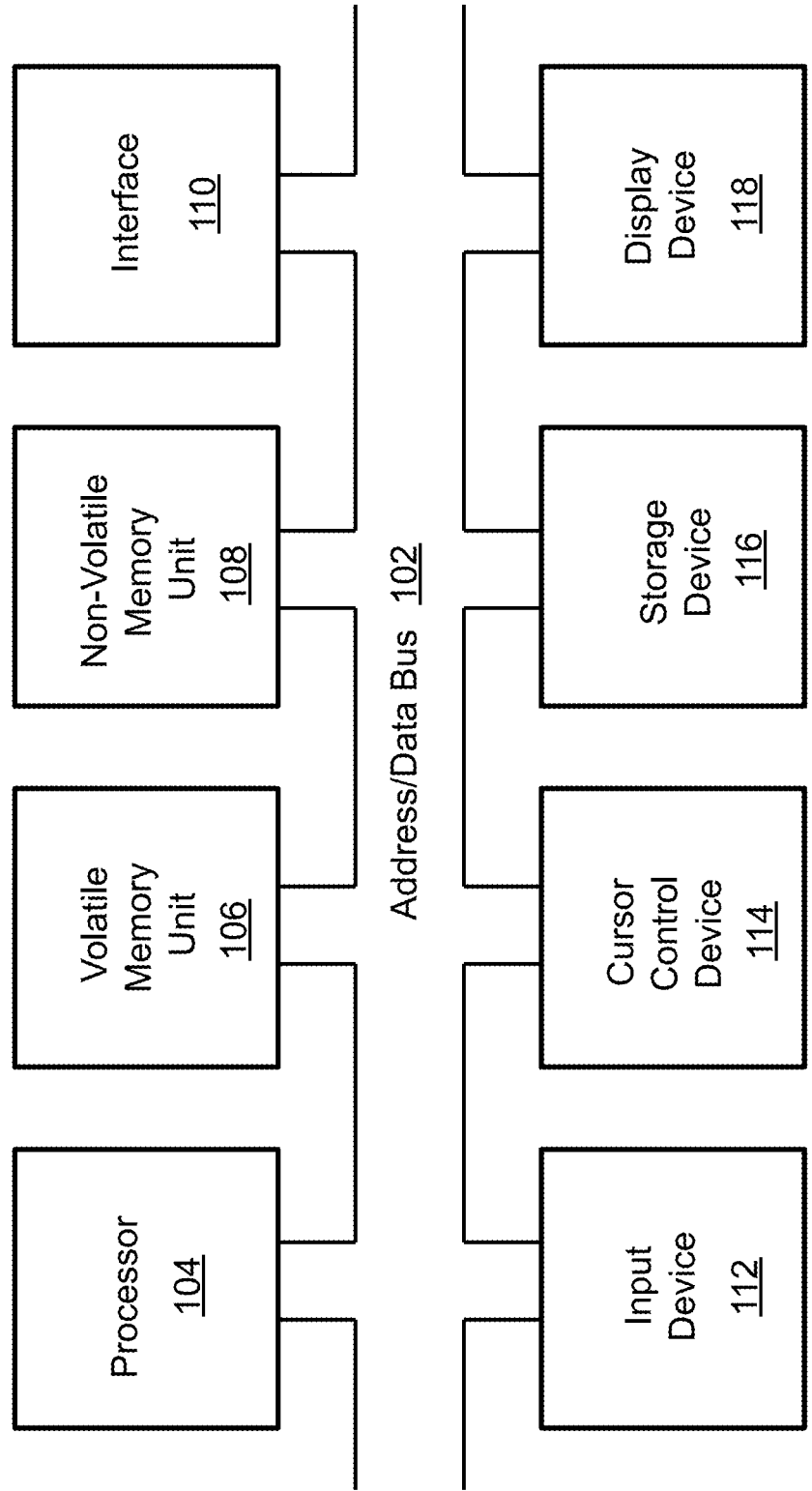
FIG. 1 is a block diagram depicting the components of a system for continuous monitoring of mobile application according to some embodiments of the present disclosure.

The present invention relates to a system for continuous monitoring of mobile applications and, more particularly, to a system for continuous monitoring of mobile applications using power efficient neuromorphic hardware. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Armando, A. Merlo, M. Migliardi, and L. Verderame. Would You Mind Forking This Process? A Denial of Service Attack on Android (and Some Countermeasures). In Proceedings of IFIP, 2012.
2. E. Athanasopoulos, V. P. Kremerlis, G. Portokalidis, and A. D. Keromytis. NaClDroid: Native Code Isolation for Android Applications. In Proceedings of ESORICS, 2016.
3. M. Bauer, M. Coatsworth, and J. Moeller. NANSA: A No-Attribution, No-Sleep Battery Exhaustion Attack for Portable Computing Devices.
4. T. Blasing, A.-D. Schmidt, L. Batyuk, S. A. Camtepe, and S. Albayarak. An Android Application Sandbox System for Suspicious Software Detection. In Proceedings of MALWARE, 2010.
5. A. Bose, X. Hu, K. G. Shin, and T. Park. Behavioral Detection of Malware on Mobile Handsets. In Proceedings of mobiSys, 2008.
6. T. K. Buennemeyer et al. Mobile Device Profiling and Intrusion Detection using Smart Batteries. In Proceedings of HICSS, 2008.
7. I. Burguera, U. Zurutuza, and S. Nadjm-Tehrani. Crowdroid: Behavior-Based Malware Detection System for Android. In Proceedings of SPSM, 2011.
8. E. Candes, X. Li, Y. Ma, and J. Wright, "Robust Principal Component Analysis?", IEEE PAMI 2011.
9. Cruz-Albrecht, J., Derosier, T., and Srinivasa, N. (2013) Scalable neural chip with synaptic electronics using CMOS integrated memristors, Nanotechnology, vol. 24, p. 384011 (11 pp), 2013, Special Issue on Synaptic Electronics.
10. A. Desnos, and G. Gueguen. Android: From Reversing to Decompilation. In BlackHat, 2011.
11. W. Enck, P. Gilbert, B.-G. Chun, L. P. Cox, J. Jung, P. McDaniel, and A. N. Sheth. Taintdroid: An Information-Flow Tracking System for Real-time Privacy Monitoring on Smartphones. In Proceedings of OSDI, 2010.
12. P. Faruki, V. Ganmoor, V. Laxmi, M. S. Gaur, and A. Bharmal. AndroSimilar: Robust Statistical Feature Signature for Android Malware Detection. In Proceedings of SIN, 2013.
13. P. Faruki, A. Bharmal, V. Laxmi, V. Ganmoor, M. S. Gaur, and M. Conti. Android Security: A Survey of Issues, Malware Penetration and Defenses. IEEE Communications Surveys and Tutorials, 17(2), pages 998-1022, December 2014.
14. Y. Feng, S. Anand, I. Dilling, and A. Aiken. Apposcopy: Semantics-Based Detection of Android Malware through Static Analysis, In Proceedings of FSE, 2014.
15. Hammond, D. K., Vandergheynst, P. and Gribonval, R., 2011. Wavelets on graphs via spectral graph theory. Applied and Computational Harmonic Analysis, 30(2), pp. 129-150.
16. Hoffmann, H., Howard, M. D. and Daily, M. J., 2011, July. Fast pattern matching with time-delay neural networks. In the 2011 International Joint Conference on Neural Networks (IJCNN), (pp. 2424-2429). IEEE.
17. H. Kim, J. Smith, and K. G. Shin. Detecting Energy-Greedy Anomalies and Mobile Malware Variants. In Proceedings of MobiSys, 2008.
18. M. Lindorfer, M. Neugschwandtner, L. Weichselbaum, Y. Fratantonio, V. van der Veen, and C. Platzer. ANDRUBIS—1,000,000 Apps Later: A View on Current Android Malware Behavior, In Proceedings of BADGERS, 2014.
19. W. Maass, T. Natschlager, H. Markram. Real-time computing without stable states: A new framework for neural computation based on perturbations. Neural computation, 14:11, pages 2531-2560. November 2002.
20. A. Merlo, M. Migliardi, and P. Fontanelli. On Energy-Based Profiling of Malware in Android. In Proceedings of HPCS, 2014.
21. Kang-Yu Ni and Tsai-Ching Lu, "Information Dynamic Spectrum Characterizes System Instability Toward Critical Transitions," EPJ Data Science, 3:28, 2014.
22. J. Oberheide and C. Miller. Dissecting the Android Bouncer, In SummerCon, 2012.
23. G. Portokalidis, P. Homburg, K. Anagnostakis, and H. Bos. Paranoid Android: Versatile Protection for Smartphones. In Proceedings of ACSAC, 2010.
24. V. Rastogi, Y. Chen, and X. Jiang. DroidChameleon: evaluating Android anti-malware against transformation attacks. In ASIACCS, pages 329-334. ACM, 2013.
25. A. Reina, A. Fattori, L. Cavallaro. A System call-centric Analysis and Stimulation Technique to Automatically Reconstruct Android Malware Behaviors, In EuroSec, 2013.
26. H. T. T. Truong, E. Lagerspetz, P. Nurmi, A. J. Oliner, S. Tarkoma, N. Asokan and S. Bhattacharya. The Company you Keep: Mobile Malware Infection Rates and Inexpensive Risk Indicators. In Proceedings of WWW, 2014.
27. A.-D. Schmidt et al. Static Analysis of Executables for Collaborative Malware Detection on Android. In Proceedings of IEEE ICC, 2009.
28. A.-D. Schmidt, A. Camtepe, S. and Albayrak. Static Smartphone Malware Detection. In Proceedings of the $5^{th}$ Security Research Conference, 2010.
29. Thomas Schreiber, "Measuring Information Transfer", Phys. Rev. Lett. 85(2): 461-464, 2000.
30. A. Shabtai, R. Moskovitch, Y. Elovici, and C. Glezer. Detection of Malicious Code by Applying Machine Learning Classifiers on Static Features: A State-of-the-Art Survey. In Inf. Secur. Tech. Rep., 14:16-29, February 2009.
31. A. Shabtai, U. Kanonov, and Y. Elovici. Intrusion Detection for Mobile Devices using the Knowledge-based, Temporal Abstraction Method. Journal of Systems Software, 83, pages 1524-1537, August 2010.
32. A. Shabtai, U. Kanonov, Y. Elovici, C. Glezer, and Y. Weiss. Andromaly: A Behavioral malware Detection Framework for Android Devices. Journal of Intelligent Information Systems, p. 1-30, 2011.
33. Srinivasa, N., and Cho, Y. K. (2014), Unsupervised Discrimination of Patterns in Spiking Neural Networks with Excitatory and Inhibitory Synaptic Plasticity, Frontiers in Computational Neuroscience, vol. 8.
34. Srinivasa, N., and Cho, Y. K. (2012), A Self-Organizing Spiking Neural Model for Learning Fault-Tolerant Spa- 35. Thibeault, C. M., Harris, F. C., and Srinivasa, N. (2014), Using Games to Embody Spiking Neural Networks for Neuromorphic Hardware, International Journal of Computers and their applications, vol. 21, no. 1, pp. 40-53.
36. R. Xu, H. Saidi, and R. Anderson. Aurasium: Practical Policy Enforcement for Android Applications. In Proceedings of USENIX Security, 2012.
37. L. K. Yan, and H. Yin. DroidSscope: Seamlessly Reconstructing the OS and Dalvik Semantic Views for Dynamic Android Malware Analysis. In Proceedings of USENIX Security, 2012.
38. X. Yan, Joy Y. Zhang. "Early Detection of Cyber Security Threats using Structured Behavior Modeling". ACM Transactions on Information and System Security, Vol. V, No. N. 2013.
39. T. Zhou and D. Tao. "GoDec: Randomized low-rank & sparse matrix decomposition in noisy case." ICML 201.
40. O'Brien, M. J. and Srinivasa, N., 2013. A spiking neural model for stable reinforcement of synapses based on multiple distal rewards. Neural Computation, 25(1), pp. 123-156.

(2) PRINCIPAL ASPECTS

Various embodiments of the invention include three "principal" aspects. The first is a system for continuous monitoring of mobile applications. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
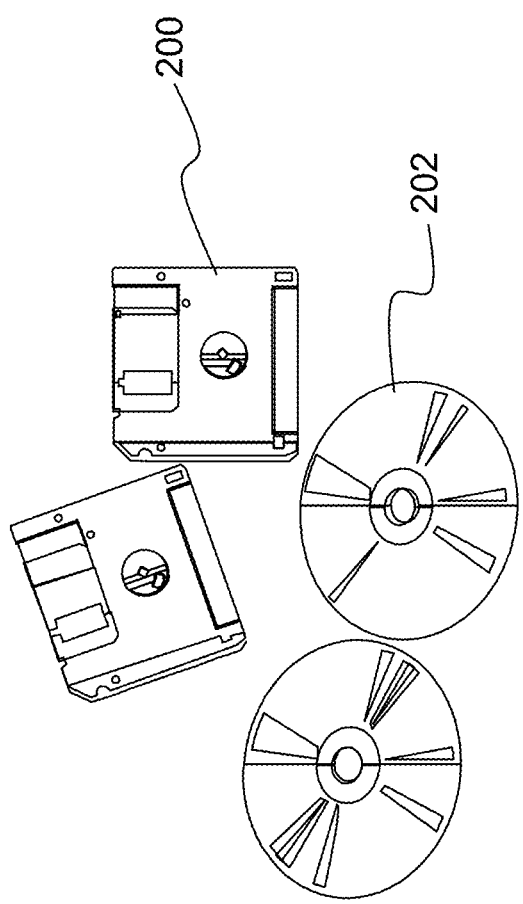
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Figure 3:
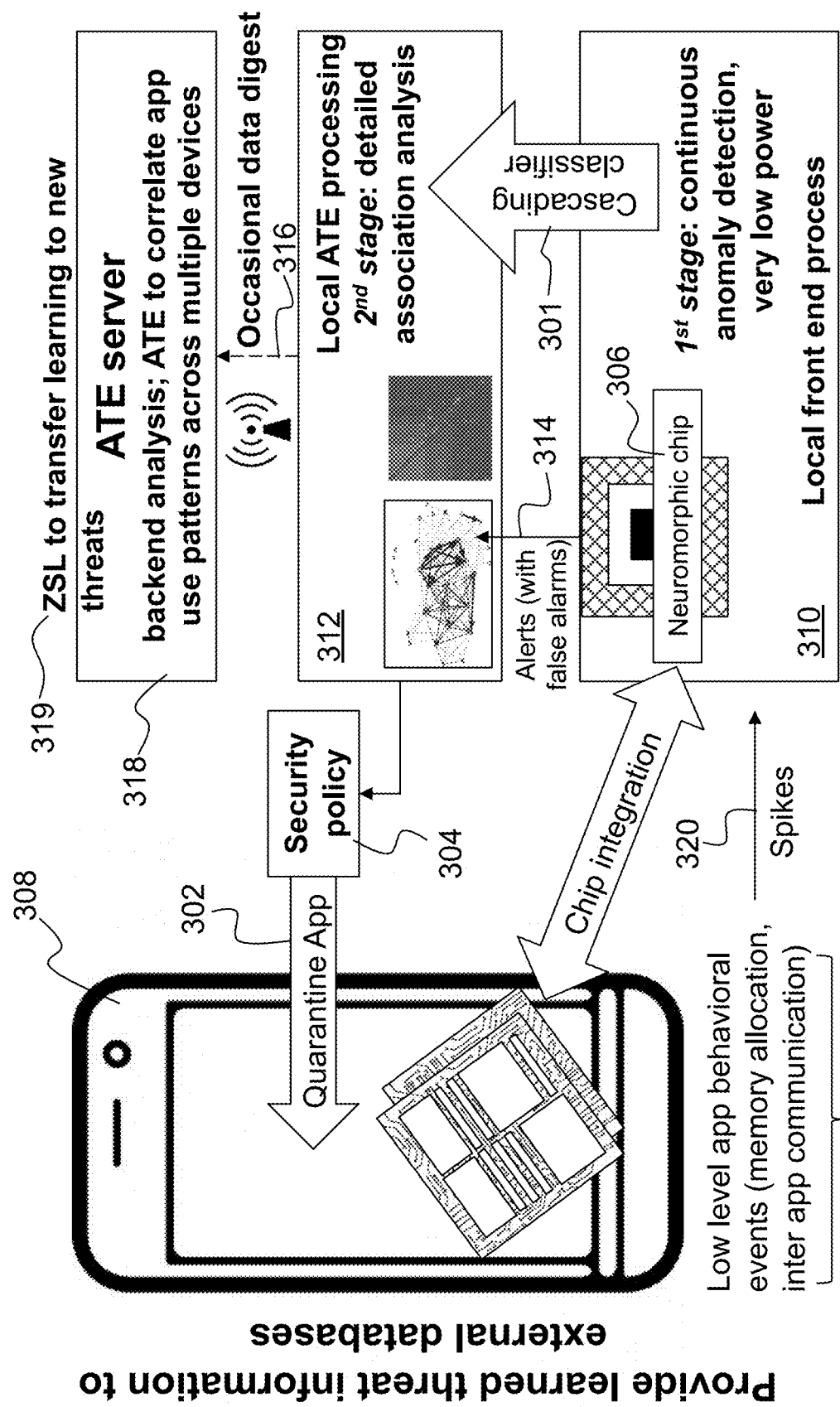
FIG. 3 is an illustration the system architecture according to some embodiments of the present disclosure.

Described is a low power system for mobile devices that provides continuous, behavior-based security validation of mobile device applications (apps) using power efficient neuromorphic hardware for anomaly detection and unique algorithms for causal inference of inter-app and intra-app behavioral patterns. FIG. 3 is an illustration of the system architecture. The system described herein comprises the following functions: 1) construct and monitor time series data related to app behavior, including but not limited to, memory allocation, permission requests, and inter-app communication (element 300); 2) learn the signature of known vetted apps; 3) detect patterns associated with malware; 4) filter out false alarms to prevent unnecessary quarantine of apps; and 5) quarantine (element 302) apps when the risk of malware is above a threshold relative to a risk management security policy (element 304). The quarantine (element 302) will isolate the identified apps, such that they cannot be launched and cause additional harm, until users are notified and decide to permanently delete them.

As shown in FIG. 3, using low-power (milliwatt (mW) order) neuromorphic hardware (e.g., neuromorphic chip 306), the invention according to embodiments of the present disclosure provides online learning and classification of app behaviors and code analysis for continuous malware detection in mobile devices 308. The Associative Transfer Entropy (ATE) component uncovers anomalous behavior and collusions between applications, while the Zero-Shot Learning (ZSL) detects anomalies associated with new threats.

The system design involves two stages, as shown in FIG. 3. The first-stage 320 neuromorphic component runs continuously on mobile devices 308 due to its low power burden. Discrete events, such as memory, storage, or network accesses, are transformed into a continuous measure of behavior over time and then input into the neuromorphic liquid state machine architecture for high-dimensional, context-aware classification and anomaly detection of malware behavior. Optionally, the hardware (element 306) can be utilized for fast static analysis on apps' (binary) codes to vet against known vulnerabilities.

The second-stage 312 intermittent analysis component responds to malware alerts 314 issued by the first-stage 310 component. Algorithms running on the mobile device's 308 CPU make causal inferences and detect instances of various threats given inferred contexts using Associative Transfer Entropy (ATE), which measures the effect and amount of information transfer between different apps. A detailed description of ATE can be found in U.S. application Ser. Nos. 13/904,945 and 14/209,314, which are hereby incorporated by reference as though fully set forth herein. Data digested (element 316) from each mobile device 308 is occasionally forwarded to an external server 318 such that ATE can correlate app usage patterns across multiple devices to detect more sophisticated, stealthy attacks. To detect unknown future threats, Zero-Shot Learning (ZSL) augments ATE using semantic knowledge transfer to classify an input time series or communication patterns of previously unknown threats (element 319). Once ZSL identifies new threats (element 319), it transfers threat knowledge between various mobile devices 308. As such, it is responsive to future threats that possess some detectable behavioral signature. A cascading classifier 301 comprises the first-stage 310 component and the second-stage 312 intermittent analysis component. Cascading classifier 301 refers to two or more classifiers acting in series to improve classification performance.

The system according to embodiments of the present disclosure addresses continuous monitoring of mobile applications and continuous vetting against known vulnerabilities, as well as detecting and protecting against future threats. The integration of external threat information sources (e.g., US-CERT Cyber Security Alerts and Bulletins, NIST National Vulnerability Database, Web Application Security Project) is specified for input of known threats to the system. The system described herein is also able to feed new threat discoveries back to these sources.

(3.1) Neuromorphic Component (Element 306)

The invention described herein implements a continuous malware anomaly-detection system using spiking neuromorphic hardware 306. Because of very short impulses of energy expenditure, spiking neuromorphic hardware 306 automatically provides a low-power capability. The use of this hardware 306 as a front-end component results in the unique capability for continuous operation, with greatly reduced demand on limited power sources. Processing at the level of spikes also provides a powerful modality for sensor fusion. A higher-level benefit of neuromorphic hardware 306, however, is flexibility. Specifically, because neuromorphic hardware 306 is not "programmed," it is amenable to dealing with unknown inputs.

In one embodiment, a neuromorphic chip 306 is used in the first stage 310 of the system. There are several unique features of the hardware design. First, the hardware 306 computes with spikes 320 (fixed voltage pulses of very narrow width (i.e., on the order of 1-2 ms) rather than analog or digital encoding. This mode of encoding is data agnostic and is orders of magnitude more energy efficient compared to a digital system since it only consumes energy during the generation of spikes 320. Spiking hardware 306 represents signals based on the inter-spike intervals and, thus, is more area efficient since it requires a single wire to encode and transmit information unlike digital systems. Finally, it is more scalable than pure analog systems as spike based systems only require to transmit the timing but not both timing and amplitude parts of the signal in large scale systems.

Various models and algorithms have been developed that can compute with spikes 320 and, in particular, have shown that these models can perform multimodal pattern clustering and recognition as well as associative memories with high storage capacity. For instance, the on-chip learning capabilities can enable the neuromorphic chip 306 to be deployed in one of three modes of operation: unsupervised learning mode (see Literature Reference No. 33) where there is no human in the loop or ground truth, supervised learning mode (see Literature Reference No. 34) where the user can train the chip 306 to learn (for example the classes of objects) and then deployed after the learning is completed or in a reinforcement learning mode (see Literature Reference Nos. 35 and 40), where the chip 306 receives periodic quality of performance feedback (for example, good, bad, etc.) that enables the neuromorphic chip 306 to adapt and learn on-chip. This on-chip learning capability also offers minimal programming, interfacing and software cost while enabling rapid prototyping possibilities. The inputs to the chip 306 will be in the form of spike trains (element 320) encoded offline and then fed to the chip 306, and the neural network on the chip 306 will process the incoming spikes 320.

In this mode of operation, the chip 306 functions as a plastic reservoir where the synapses between neurons in the reservoir adapt the gain on the synapses based on spike timing dependent plasticity (STDP). This process is akin to a nonlinear and high-dimensional projection of sensory data into a spatio-temporal space where the data can be readily separated using linear decision boundaries. More specifically, during training, to realize the linear decision boundaries, the spiking activity of a subset of the neurons in the chip 306 is decoded via the output pads and performs a linear regression based learning operation, wherein the firing rates of the neurons sampled at the output pads are linearly combined to cause an output label neuron to fire.

(3.1.1) Neural Chip and Board Design

Figure 4:
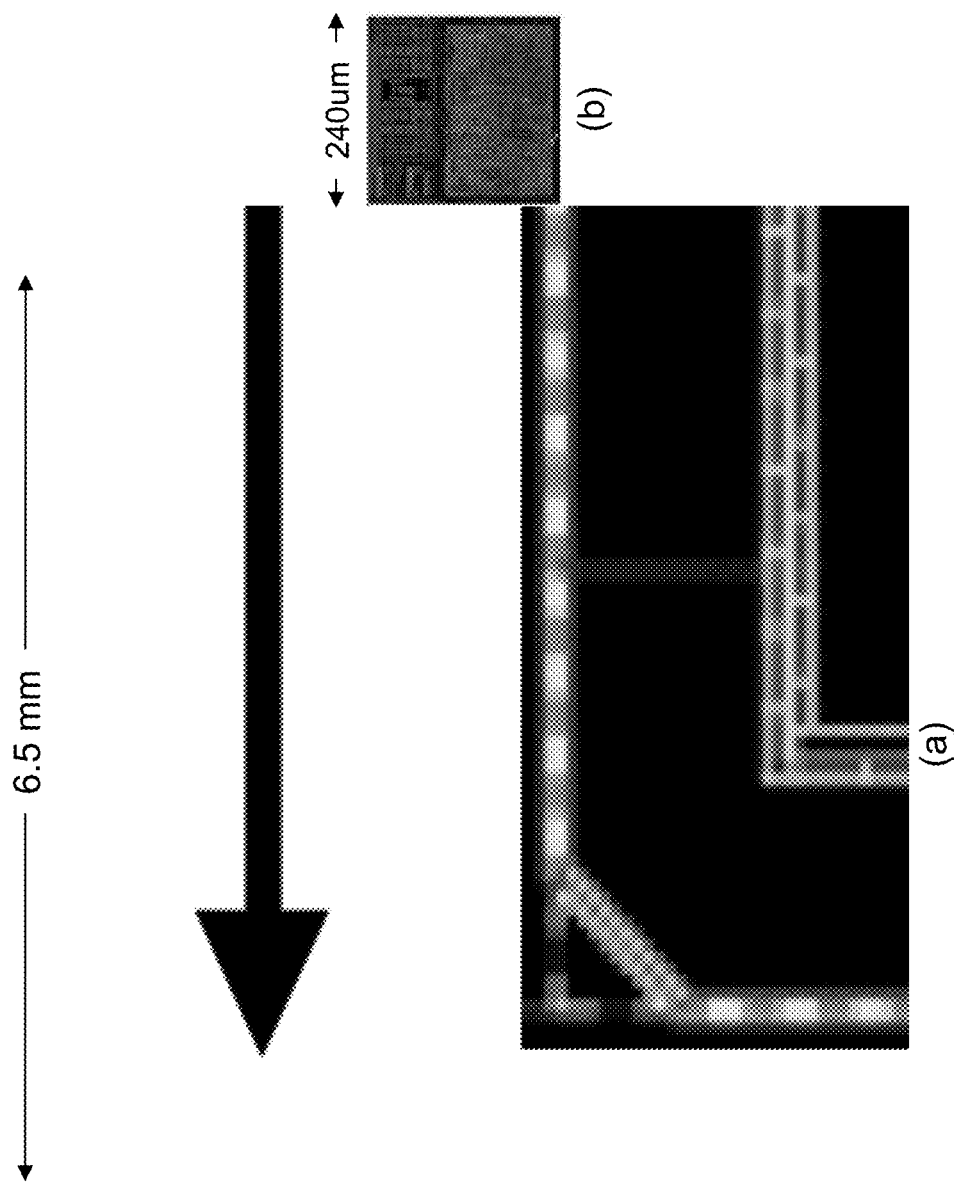
FIG. 4 is an illustration of a complementary metal-oxide-semiconductor (CMOS) neural chip with neurons according to some embodiments of the present disclosure.
Figure 6:
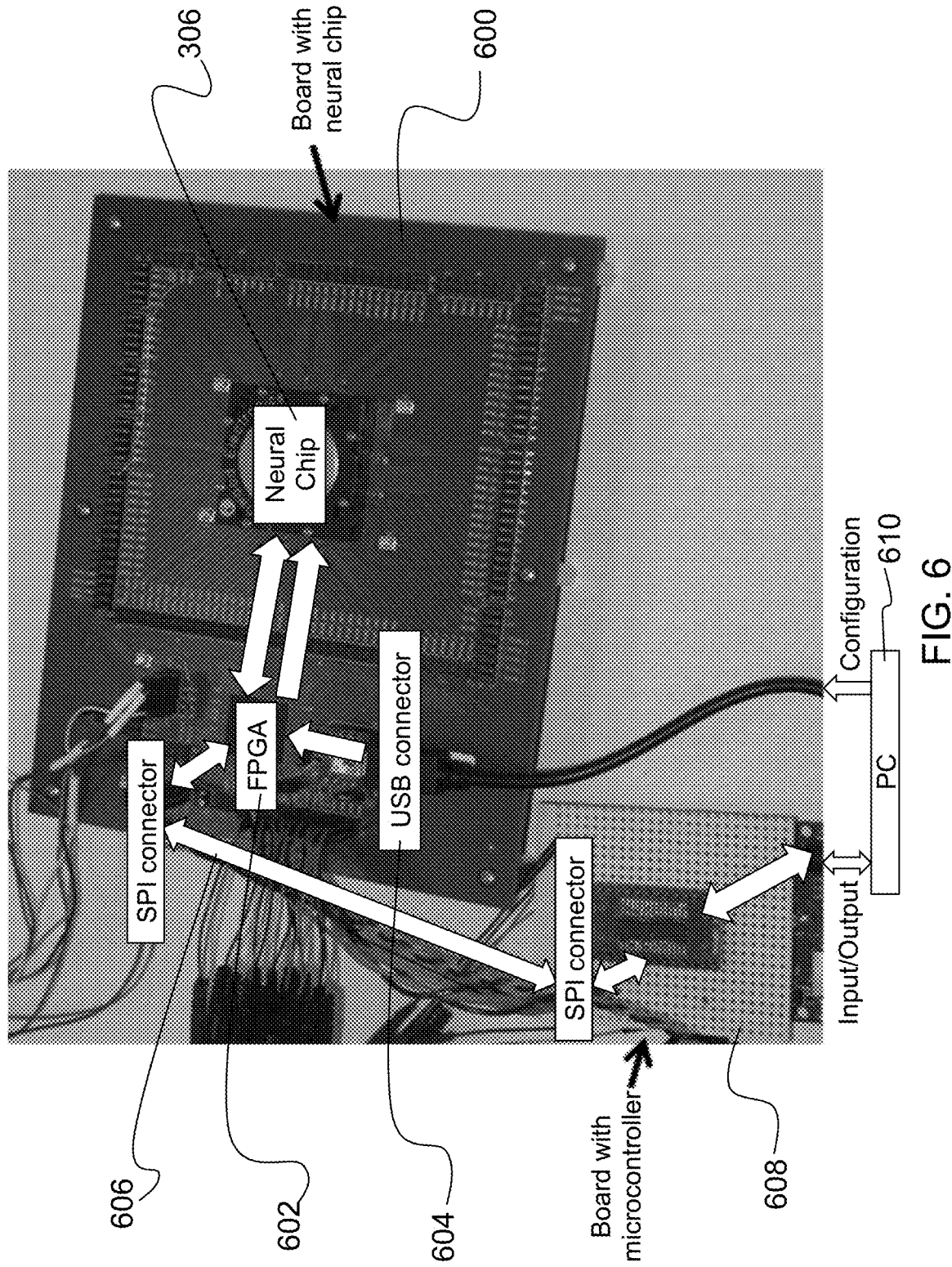
FIG. 6 is an illustration of boards to interface the neural chip with a computer for evaluation according to some embodiments of the present disclosure.

FIG. 4 shows the layout of a neural chip 306 with 576 neurons (see Literature Reference No. 9 and U.S. application Ser. No. 15/338,228, which is hereby incorporated by references as though fully set forth herein) as an example of a chip 306 that could be used with the approach according to embodiments of the present disclosure. The table in FIG. 5 shows key specifications of the chip 306. The chip 306 has 9,216 synapses. Each synapse includes a weight adaptation circuit based on STDP. To operate, the chip custom boards are specified. These boards are used to interface the chip 306 with a computer. The boards can be used for initial evaluation of different processing neural networks in the chip 306. FIG. 6 illustrates a prototype board 600.

The board 600 with the neural chip 306 contains the following. A custom neural chip 300 is located inside a socket. A Field Programmable Gate Array (FPGA) 602 Lattice XO2 7000ZE chip is used to convert serial input/output external data into parallel spike data used by the neural chip 306. This FPGA 602 is also used to control the neural chip 306. A voltage converter based in Low Dropout (LDO) chip provides power to the neural chip 306. An Erasable Programmable Read Only Memory (EPROM) chip stores the configuration of the neural chip 306. This configuration includes the topology of the neural network and other programmable parameter settings of the neurons and synapses. A universal serial bus (USB) connector 604 is used to load the neural network topology to be implemented by the neural chip 306. This is used only during initial configuration, but not during normal neural operation. A serial peripheral interface (SPI) connector 606 is used to transmit data between this board 600 and the board with the microcontroller 608.

The board with microcontroller 608 contains a small commercial microcontroller board (e.g., model Arduino UNO R3, with an ATmega328 microcontroller chip from ATMEL located at 2355 West Chandler Blvd., Chandler, Ariz., USA 85224). It is used to provide input data into the neural board 600 and to receive data from the neural board 600. The microcontroller board 608 can be connected to a PC 610 for testing purposes. Level converter chips are soldered in top of the commercial microcontroller board 608. This is to convert voltage levels used by the microcontroller to those used by the neural board 600.

(3.1.2) Neuromorphic Reservoir Classification

Figure 7:
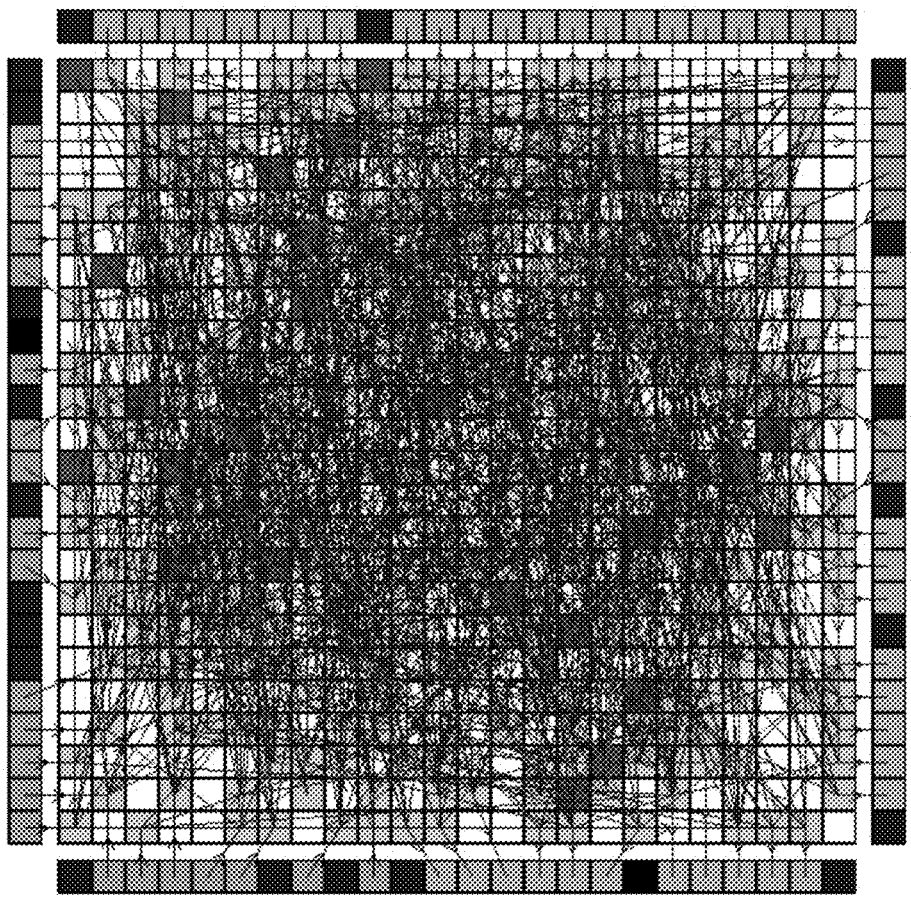
FIG. 7 is an illustration of a random neural net as configured on a 576-neuron neuromorphic chip according to some embodiments of the present disclosure.

The 576-neuron neuromorphic hardware 306 described above has been utilized to perform learned classification of input signals. FIG. 7 depicts a random neural net as configured on a 576-neuron neuromorphic chip. The network itself consists of 325 neurons. Blue neurons (of which there are 300) are excitatory, red neurons (of which there are 25) are inhibitory. Bright green IO (input/output) pads (represented by green squares) are input, orange IO pads (represented by orange squares) are output.

A random graph, such as the one shown in FIG. 7, acts suitably as a reservoir, in the sense of reservoir computing (e.g., liquid state machines (LSMs)). In general, LSMs operate by greatly expanding the dimensionality of an input vector, and transforming it via a recurrent, excitable medium with nonlinear dynamics. If activities in the excitable medium have a fading memory, arbitrary functions of the input are computable as simple linear combinations of those activities. Following this configuration, an input signal is transformed into a set of firing rates and input into the chip via input pads. The input causes activation in the network, and some of this activation is sampled via output pads. The network dynamics serve to separate input classes such that a simple linear classifier can provide a readout signal.

Figure 8A:
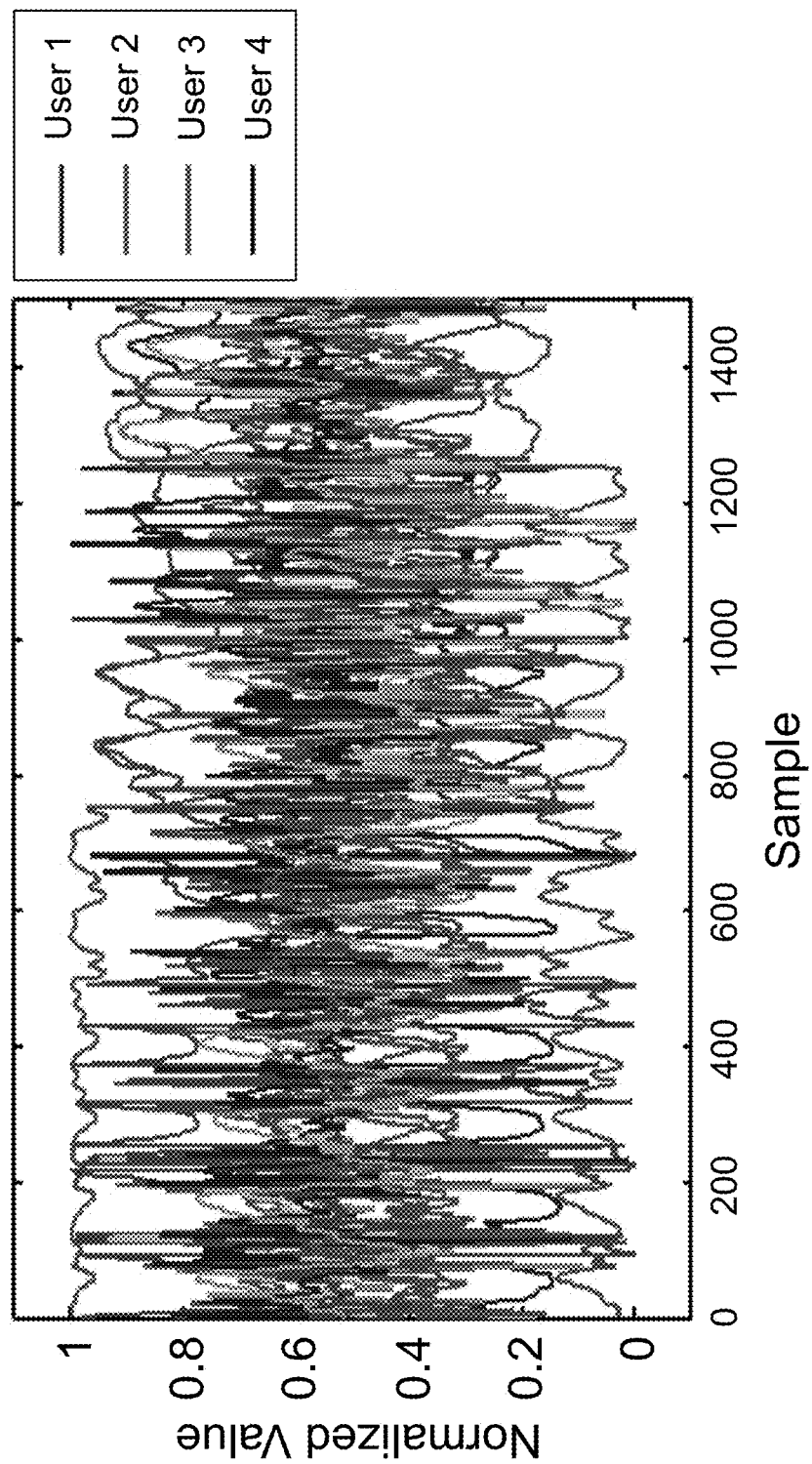
FIG. 8A is an illustration of accelerometer, magnetometer, and gyroscope data from a mobile device according to some embodiments of the present disclosure.
Figure 8B:
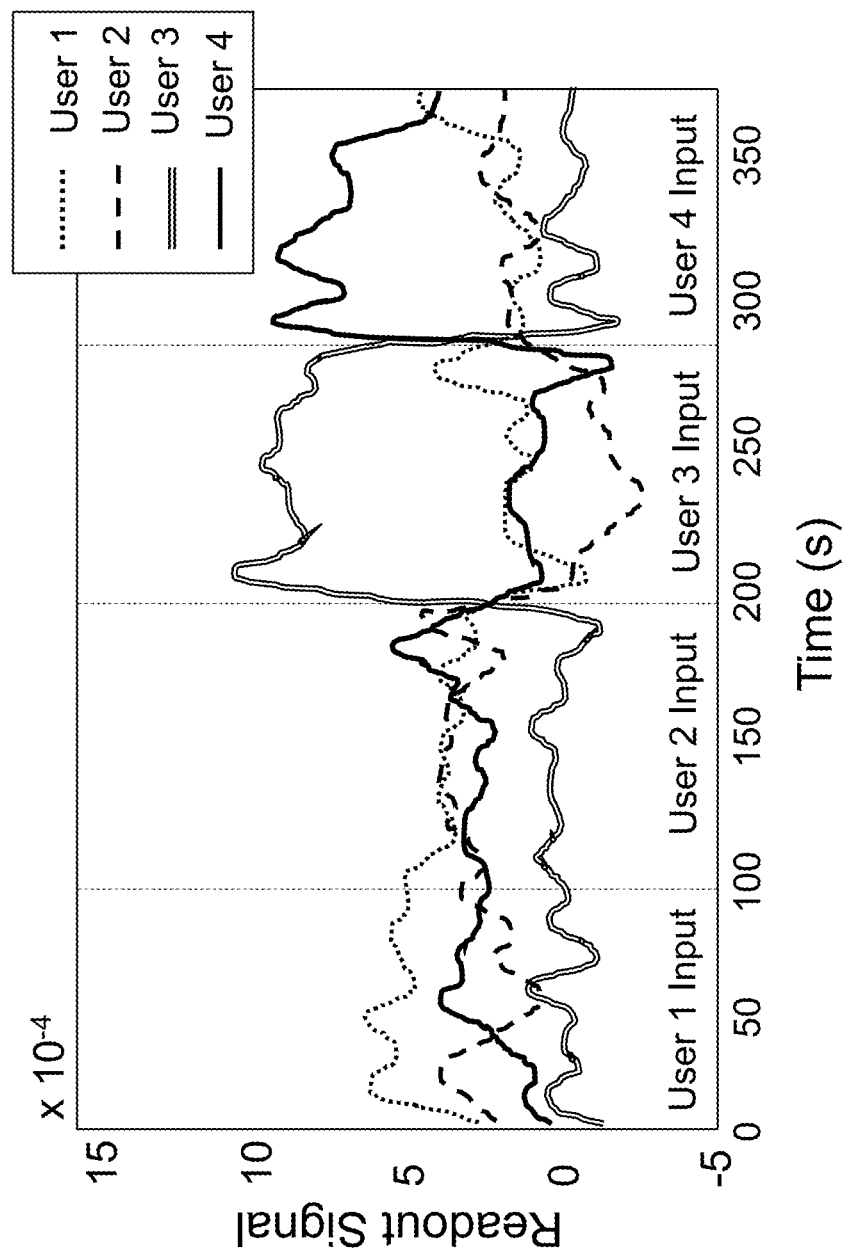
FIG. 8B is an illustration of readout signals for user classification according to some embodiments of the present disclosure.

This approach has been applied to continuous behavior-based authentication of users and use contexts on a mobile device (see U.S. application Ser. No. 15/338,228, which is hereby incorporated by reference as though fully set forth herein). FIGS. 8A and 8B display user classification for four different users (represented by different colored lines) walking with a mobile device (element 308) (stowed). Accelerometer, magnetometer, and gyroscope signals were encoded as spikes (element 320) and transmitted to the neuromorphic board (element 600). FIG. 8A shows the input signals for the different users, and FIG. 8B shows the classification signals corresponding to the different intervals when the subjects had physical access to the mobile device (element 308). With the exception of user 2, all users were clearly discriminated from the others.

Figure 9:
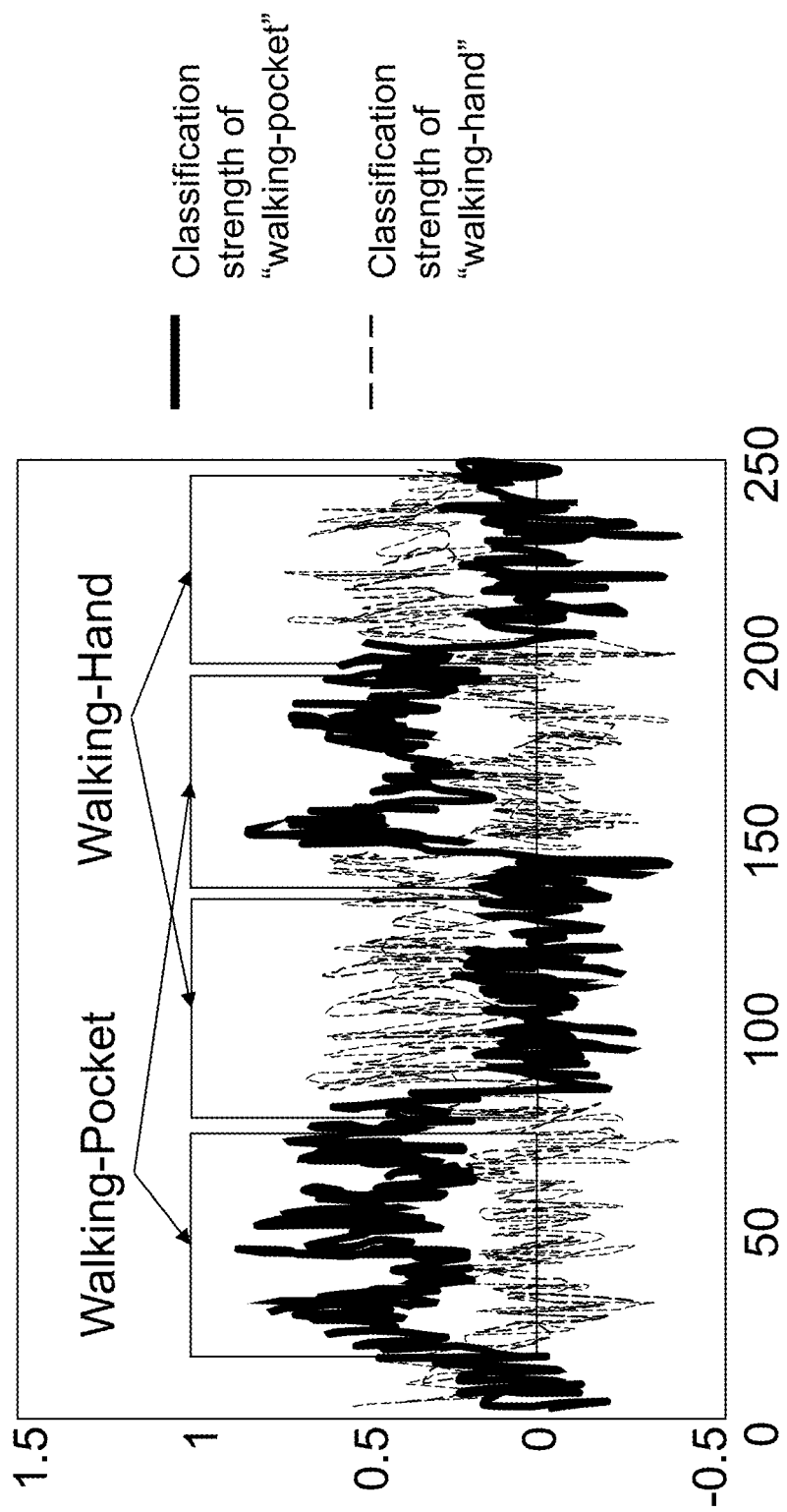
FIG. 9 is an illustration of continuous context classification output signal from a neuromorphic processor according to some embodiments of the present disclosure.

For use-context classification, FIG. 9 shows continuous context classification output signals from the neuromorphic processor. Dashed and solid lines correspond to classification strength of "walking-hand" (i.e., walking with the phone in the hand) and "walking-pocket" (i.e., walking with the phone in the pocket), respectively, with 93% accuracy.

The approach for mobile device (element 308) uses context detection described in U.S. application Ser. No. 15/338,228 is leveraged for malware detection. This enables subtler ways of detecting malicious behavior than analyzing an app's behavior with no context of the user's behavior. For example, a voiceover internet protocol (VoIP) app starting a surreptitious VoIP session to spy on the user would look completely normal when only considering the app's behavior. However, it would look very anomalous when detecting that the user is not holding the phone in a manner consistent with talking over VoIP.

(3.2) Associative Transfer Entropy (ATE) Component

The ATE analysis component according to embodiments of the present disclosure provides a powerful second line of malware behavior detection by identifying anomalies in the dependency relationships of mobile device inter-app and intra-app communications given inferred contexts (e.g., Wi-Fi access from app A to send sensitive data to app B while the phone is in a pocket), where the types of communications (i.e., network accesses, storage, etc.) to monitor are informed by threat models. ATE is used to capture the amount of pairwise directional transfer of information between app communications, as well as to distinguish the effects of the directional information transfer. This is done by finding the strength of the correlation (or anti-correlation) between time series signals from the mobile device. The effects of the directional information transfer are determined directly from this correlation (or anti-correlation) of the signals. Based on these effects and the amount of information transfer, a network representation of mobile app behavior dependencies is constructed. The network representation allows detection of attacks associated with group behaviors of apps that the monitoring of individual applications will miss.

Figure 10:
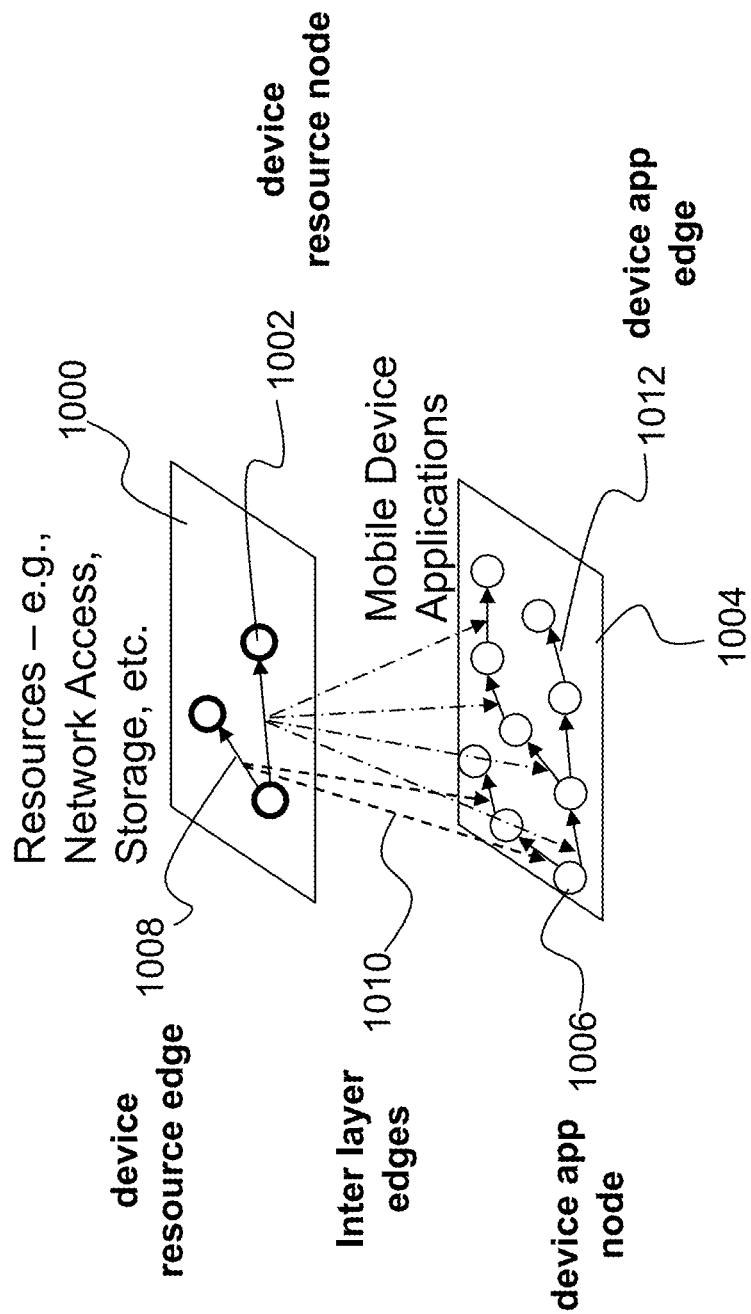
FIG. 10 is an illustration of app communication dependencies according to some embodiments of the present disclosure.

Transfer entropy (TE) (see Literature Reference No. 29) quantifies how much information is transferred from the current state into the future from one time series to another, where the time series, for example, can be inter-app communications, calls, reads, accesses, etc. The ATE measure (see Literature Reference No. 21) extends TE to further distinguish the types of information being transferred by decomposing the set of all possible states into specific associated states. This enables quantification of the amount of specific information transfer. An intuitive example is to distinguish whether the dependency is associated with positive or negative correlation effects. These pairwise ATEs are then compactly represented as dependency links of a network (see FIG. 10) with an ATE matrix (ATEM) on which spectral analysis can be applied. The dependency network will change over time as the communication patterns evolve. In FIG. 10, two network layers are illustrated. In the top layer 1000, the nodes (circles 1002) represent the resources of the mobile device (e.g., network access, storage, etc.). In the bottom layer 1004, the nodes 1006 represent the individual apps running on the mobile device (e.g., texting, email, ebooks, banking, etc.). The edges (e.g., device resource edge 1008, inter layer edges 1010, device app edge 1012) between various nodes represent dependencies between the nodes.

In the second-stage 312, a first ATE sub-component detects intrusive anomalies by detecting change points of evolving ATEM networks. The situation is flagged when, for example, the app's communication patterns fundamentally change and the magnitude of the change is quantified. This is performed with a probabilistic learning framework with a graph model and a Bayesian hypothesis test. A second ATE sub-component detects subtle anomalies by learning an ATEM basis set under normal operations using sparse and low-rank (SLR) decomposition techniques (see Literature Reference Nos. 8 and 39). First, ATEMs are computed over time and a data matrix is constructed, where each column is an ATEM reshaped as a vector. The low-rank component of the SLR decomposition provides the basis for ATEMs under normal operations, and the sparse component is the residual or error of the matrix approximation. The system is then flagged if a new ATEM projected onto the basis vector space has a relatively large residual, compared to the error terms from the SLR procedure.

Figure 11A:
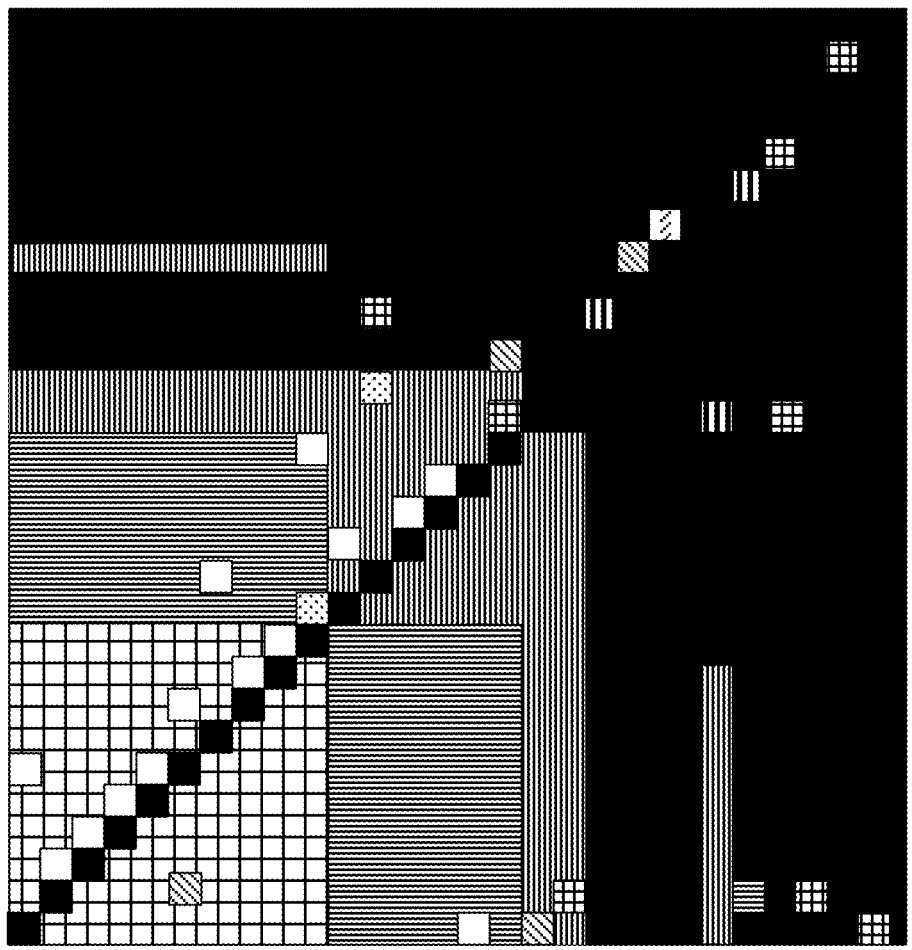
FIG. 11A is an illustration of an Associative Transfer Entropy (ATE) matrix (heat map) of message timing according to some embodiments of the present disclosure.
Figure 11B:
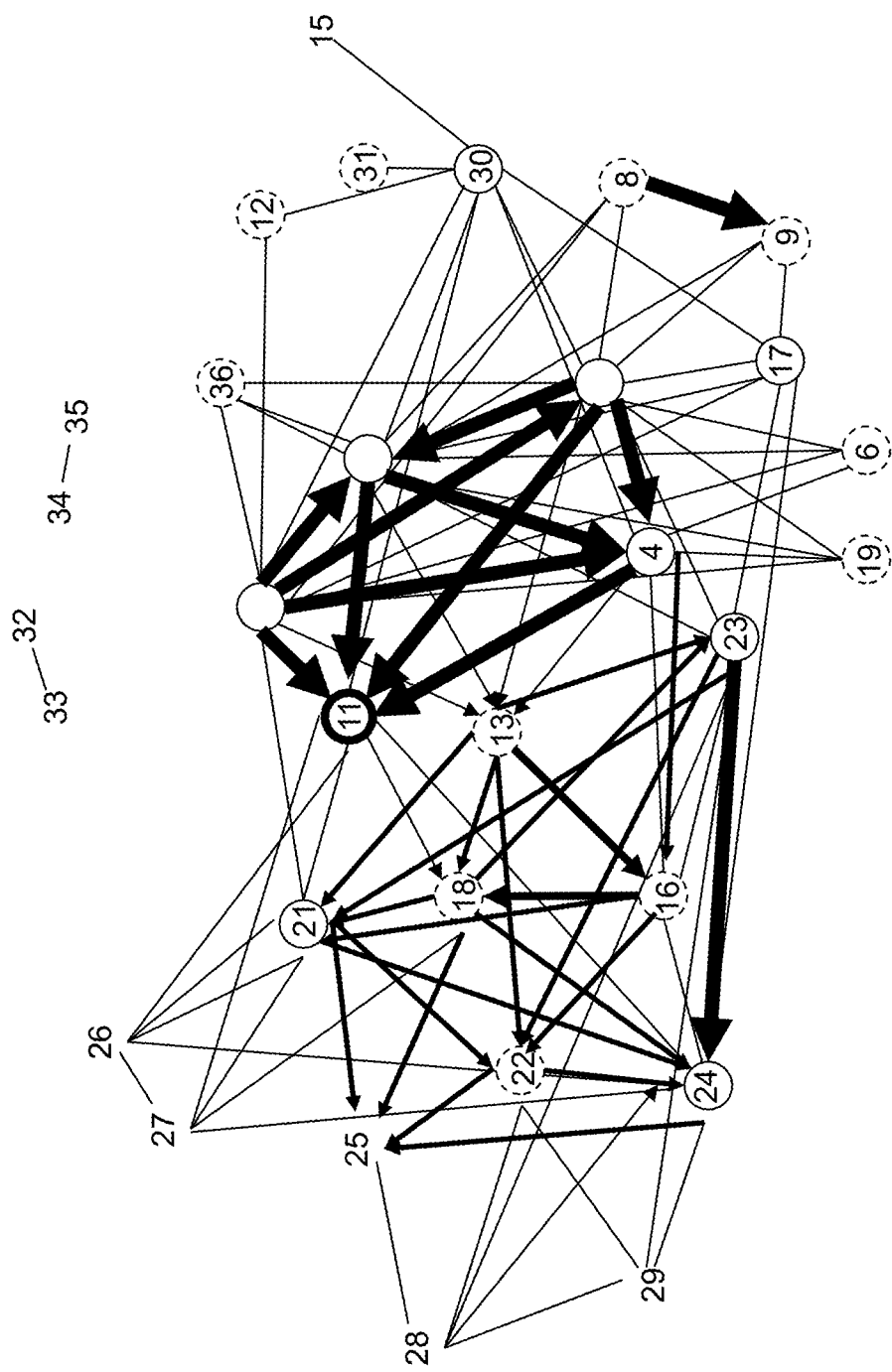
FIG. 11B is an illustration of the ATE network graph according to some embodiments of the present disclosure.
Figure 11C:
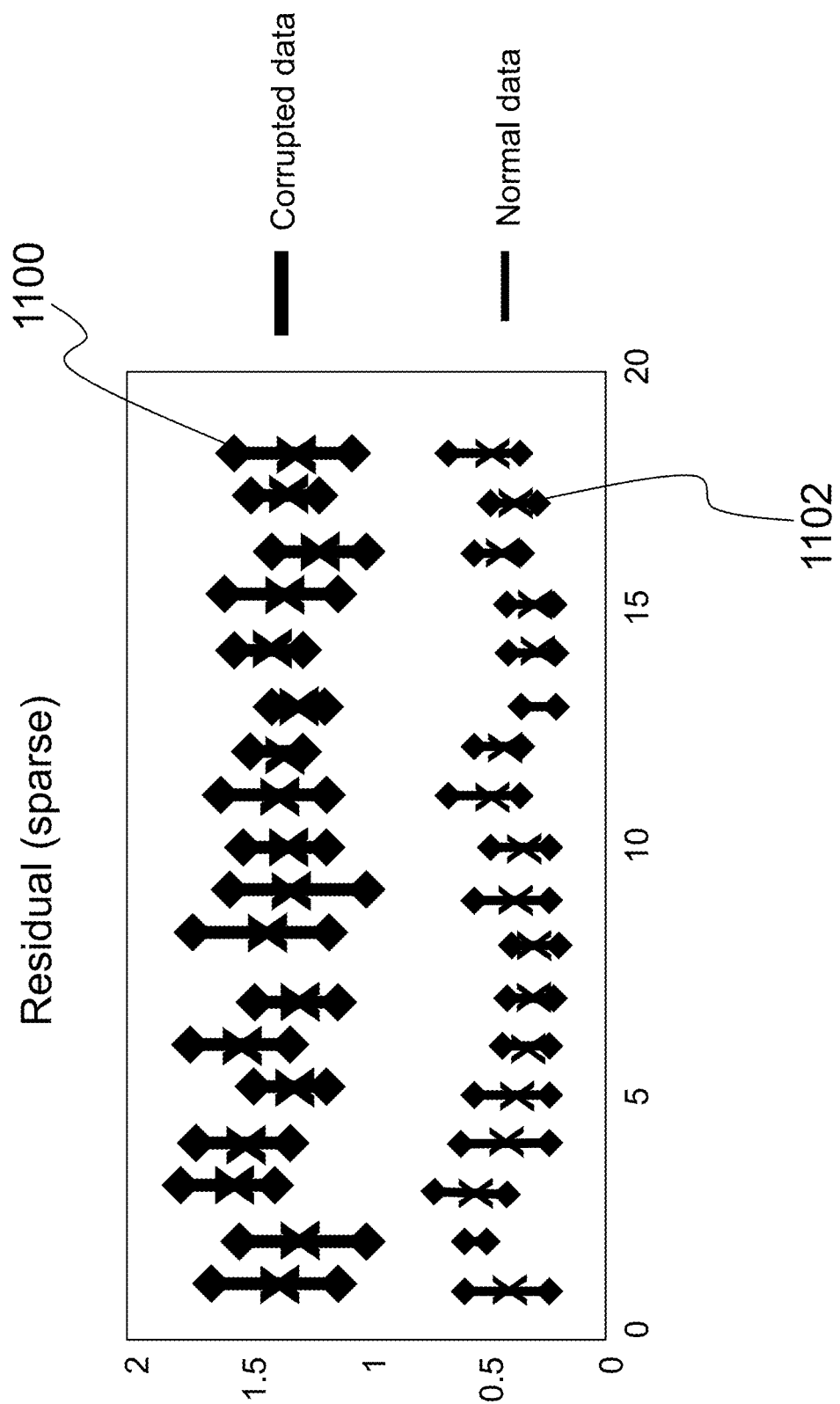
FIG. 11C is an illustration of error bars of corrupted data and error bars of normal data according to some embodiments of the present disclosure.

FIGS. 11A-11C illustrate the use of ATE to detect when observed interactions deviate from known physical causal structure. FIG. 11A shows an ATE matrix (adjacency matrix) of message timing, represented as a shaded grid (heat map). Each block in the grid represents a connection between a pair of messages. The rows in the grid represent a first message, and the columns in the grid represent the second message. The shading level of each block, where row and column meet, represents the degree of correlation between the timing of the two messages. FIG. 11B shows a network graph visualization of this, where each node (circle) represents an individual message (uniquely identified by a number). In FIG. 11C, the results of a sparse and low rank decomposition show the error bars 1100 of corrupted data are above the error bars 1102 of normal data, indicating the ability for anomaly detection, as the anomalies (corrupted data) are successfully distinguished from the normal data, based on the value of the residual.

The diversity and applicability of the information dynamic spectrum framework based on ATE according to embodiments of the present disclosure has been demonstrated in other domains. The information dynamic spectrum framework detects different critical transition types with a 95% confidence interval (see Literature Reference No. 21). These include detecting change points in unstable regions of non-Foster electric circuits, pitchfork bifurcations of chaotic systems, abrupt falls in stock indices, and exponential growth in Wikipedia editing behaviors. In addition, algorithms have been developed to detect subtle attacks on cyber-physical systems. In particular, relatively subtle changes made to controller area network (CAN) bus messages were identified (see FIGS. 11A-11C) in automotive systems because it would be difficult to spoof messages without altering the relative timing between messages.

The unique ATE-based method to infer dependency of behavior patterns between applications described herein enables detection of group behaviors, such as collusions between applications to evade permission restriction on a mobile OS. This is a challenging problem for single app-monitoring approaches, as each app may appear to be benign. Time series of inter-app and intra-app communications, such as requests, calls, and access, are used in the ATE analysis described above to understand group behaviors and detect anomalies. ATE algorithms have been executed on modest computing systems, and it is expected that optimized ATE code can run very efficiently on mobile device processors for malware detection.

(3.3) Zero-Shot Learning (ZSL) Component (Element 319)

While the app behaviors and their information transfer dependencies are learned and incrementally updated through establishing information transfer via ATE (elements 312 and 318), they are limited by the known threat patterns and their training data. In addition, in actual systems, the process of building and training "normal" profiles of the app communications can be time-consuming and difficult for highly dynamic environments. To augment the ATE causal inference process and capture unknown threats missed by ATE, a new approach of Zero-Shot Learning (ZSL) is specified that uses semantic knowledge transfer to classify an input time series or communication patterns of previously unknown threats (element 319). Conventional defense mechanisms are based on the analysis of low-level (either packet-level or flow-level) communication traffic while overlooking the latent structural information hidden in the raw traffic data. The invention described herein addresses the problem of novel pattern recognition based on the high-level structured information captured in the time series of communication traffic using (1) manifold regularization over the pattern feature/attribute graph and (2) semantic embedding of patterns into a common embedded space.

To emulate the human ability to learn previously unseen entities, ZSL uses a semantic attribute space as the bridge for transferring knowledge from seen to unseen examples. This approach is applied to describing patterns indicative of malicious network activities with the assumption that there also exist "structures" underlying the network traffic that are less ambiguous. Additionally, the discovery of misuse and anomalous patterns can be effectively treated as a problem of learning syntactic structures and semantic fragments of the "network patterns" (see Literature Reference No. 38). The unique ZSL component according to embodiments of the present disclosure learns the structured mappings between low-level app behaviors (e.g., memory allocation, permission requests, intra/inter-app communications) and attribute-level information flows, and, finally, high-level threats.

For structured mapping, powerful nonlinear representations of projection are employed and sparse optimization is used to find the solutions, which can effectively capture the strong relationships present in projection and avoid overfitting. The manifold regularization algorithm, based on Spectral Graph Wavelets (SGWs) (see Literature Reference No. 15), regularizes the noisy feature-to-attribute relationships found in training data so that nuisance factors in feature spaces are removed. These regularized relationships/mappings are used to map novel data for classification. SGW is a multi-scale graph transform that is localized in vertex and spectral domains. The nodes in the graph described herein are measuring semantic attributes, such as activations of a convolutional neural network. The values or "graph signal" are an embedding of semantic attributes in a linear space, automatically computed using the semantic attribute description. Learning is based on the assumption that nearby low-level representations should produce similar semantic representations, which translates into a smoothness criterion for the graph signal.

The multi-view semantic-embedding algorithm combines multiple sources (contexts) of sematic information about cyber threat patterns. It utilizes the mid-level representations from multiple views (i.e., attributes and word vectors). The method described herein employs a soft-max-based compatibility function to determine the compatibility score between a pattern's low-level feature and the mid-level semantic representation of the candidate class label.

In a recent study, the ZSL approach described herein was demonstrated in novel pattern recognition with images from known and unknown classes. Four unknown outdoor scene images (e.g., a construction site, roundabout, etc.) were tested by transferring knowledge of semantic attributes (e.g., concrete, dirty, cluttered space, open area, trees, etc.) from the known data in 27 scene classes (e.g., street, tunnel, dirt road, highway, driveway, etc.). Note that the task was the multi-class classification problem, which is more complex than the binary classification of threat detection. ZSL could understand the novel scenes 27X better than random chance and achieved about 70% to 90% recognition accuracy. Based on these promising results, the goal is >90% detection of unknown or less-known threats that are missed by ATE. Once ZSL has detected a previously unknown threat, it will be captured and be part of the known threats. The computational complexity of ZSL in the testing phase is very low (only involving a matrix-vector multiplication and a dot product of attribute vectors) and depends on the dimensions of features, attributes and projection matrix.

Once the first-stage (element 310) neuromorphic component issues malware alerts (element 314), the second-stage (element 312) intermittent analysis component runs Associative Transfer Entropy (ATE) algorithms on the mobile device's main central processing unit (CPU) to make causal inferences and to detect instances of various threats. ATE measures the effect and amount of information transfer between different apps under specific use contexts, and can detect attacks associated with app group behaviors that individual app monitoring without context awareness may miss (e.g., app collusion to evade permission restrictions, voice over IP operation while the phone is stowed) (element 318). To detect previously unknown threat patterns with limited, or no, training data and to transfer threat knowledge among mobile devices, ATE is augmented by ZSL (element 319). The system described herein combines the power efficiency of neuromorphic hardware (element 306) with detailed malware analyses to infer behavioral anomalies from an ensemble of mobile device (element 308) applications.

Continuously monitoring mobile applications poses challenges that the invention described herein is particularly well suited to address. Power efficiency, required for continuous monitoring, is a challenge that requires a new processing paradigm. A specialized processing unit that removes burden from the device's main CPU and runs on a fraction of the power, coupled with ATE and ZSL algorithms offers significant utility for continuous monitoring of mobile applications. The neuromorphic stage (element 310) in the approach according to embodiments of the present disclosure is ideal for continuous classification with a high rate of anomaly detection, whereas the ATE stage (element 312) is ideal for intermittent classification to remove false alarms while ZSL (element 319) identifies future threats. Implementation on commercial smartphone chipsets will provide continuous behavior-based application monitoring tied to robust risk management policies for actionable threat mitigation (e.g. disabling or removing the app/malware).

The system according to embodiments of the present disclosure has applications in continuous behavior-based security validation of mobile device applications. The development of improved low power security systems for mobile devices can be used in vehicle manufacturing companies, in the defense and commercial sectors, as a means of defending against emerging cyber threats. Mobile devices are increasingly being embedded in vehicles and aircraft and secure operation of these devices is becoming more and more critical given the intent for adversaries to co-opt these systems through cyber warfare. The invention offers transformative capabilities for the development of next generation behavior-based malware detection.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A mobile device, comprising:
a neuromorphic chip mounted in the mobile device that runs continuously on the mobile device, wherein the neuromorphic chip performs operations of:
monitoring time series related to individual mobile device application behaviors;
detecting and classifying pattern anomalies associated with a known malware threat in the time series related to individual mobile device application behaviors;
generating at least one alert related to the known malware threat;
receiving the at least one alert related to the known malware threat from the neuromorphic chip;
in an associative transfer entropy (ATE) stage, identifying pattern anomalies in dependency relationships of mobile device inter-application and intra-applications communications using an ATE measure;
in a zero-shot learning (ZSL) stage, detecting pattern anomalies associated with new malware threats using a ZSL component; and
isolating a mobile device application having a risk of malware above a predetermined threshold according to a risk management policy.

2. The mobile device as set forth in claim 1, wherein the one or more processors further perform an operation of filtering out any false alarms of malware threats to prevent unnecessary isolation of mobile device applications in the ATE stage.

3. The mobile device as set forth in claim 1, where in detecting pattern anomalies associated with new malware threats, the one or more processors further perform an operation of using the ZSL component for augmenting the ATE measure using semantic knowledge transfer.

4. The mobile device as set forth in claim 3, wherein the ZSL component transfers new malware threat knowledge among a plurality of mobile devices.

5. The mobile device as set forth in claim 1, where in identifying pattern anomalies in dependency relationships, the one or more processors further perform an operation of generating a network representation of mobile application behavior from an amount of directional information transfer between mobile device applications and effects of the directional information transfer obtained with the ATE measure.

6. A computer implemented method for continuous monitoring of mobile device applications on a mobile device, the method comprising an act of:
causing a neuromorphic chip mounted in the mobile device that runs continuously on the mobile device to perform operations of:
monitoring time series related to individual mobile device application behaviors;
detecting and classifying pattern anomalies associated with a known malware threat in the time series related to individual mobile device application behaviors;
generating at least one alert related to the known malware threat;
receiving the at least one alert related to the known malware threat from the neuromorphic chip;
in an associative transfer entropy (ATE) stage, identifying pattern anomalies in dependency relationships of mobile device inter-application and intra-applications communications using an ATE measure;
in a zero-shot learning (ZSL) stage, detecting pattern anomalies associated with new malware threats using a ZSL component; and
isolating a mobile device application having a risk of malware above a predetermined threshold according to a risk management policy.

7. The method as set forth in claim 6, wherein the one or more processors further perform an operation of filtering out any false alarms of malware threats to prevent unnecessary isolation of mobile device applications in the ATE stage.

8. The method as set forth in claim 6, where in detecting pattern anomalies associated with new malware threats, the one or more processors further perform an operation of using the ZSL component for augmenting the ATE measure using semantic knowledge transfer.

9. The method as set forth in claim 8, wherein the ZSL component transfers new malware threat knowledge among a plurality of mobile devices.

10. The method as set forth in claim 6, where in identifying pattern anomalies in dependency relationships, the one or more processors further perform an operation of generating a network representation of mobile application behavior from an amount of directional information transfer between mobile device applications and effects of the directional information transfer obtained with the ATE measure.

11. A computer program product for continuous monitoring of mobile device applications on a mobile device, the computer program product comprising:
a non-transitory computer-readable medium having executable instructions encoded thereon, such that upon execution of the instructions by one or more processors, the one or more processors perform operations of:
causing a neuromorphic chip mounted in the mobile device that runs continuously on the mobile device to perform operations of:
monitoring time series related to individual mobile device application behaviors;
detecting and classifying pattern anomalies associated with a known malware threat in the time series related to individual mobile device application behaviors; and
generating at least one alert related to the known malware threat; and causing the mobile device, having one or more processors and a non-transitory computer-readable medium having executable instructions encoded thereon such that when executed, to perform operations of:
  receiving the at least one alert related to the known malware threat from the neuromorphic chip;
  in an associative transfer entropy (ATE) stage, identifying pattern anomalies in dependency relationships of mobile device inter-application and intra-applications communications using an ATE measure;
  in a zero-shot learning (ZSL) stage, detecting pattern anomalies associated with new malware threats using a ZSL component; and
  isolating a mobile device application having a risk of malware above a predetermined threshold according to a risk management policy.

12. The computer program product as set forth in claim 11, wherein the one or more processors further perform an operation of filtering out any false alarms of malware threats to prevent unnecessary isolation of mobile device applications in the ATE stage.

13. The computer program product as set forth in claim 11, where in detecting pattern anomalies associated with new malware threats, the one or more processors further perform an operation of using the ZSL component for augmenting the ATE measure using semantic knowledge transfer.

14. The computer program product as set forth in claim 13, wherein the ZSL component transfers new malware threat knowledge among a plurality of mobile devices.

15. The computer program product as set forth in claim 11, where in identifying pattern anomalies in dependency relationships, the one or more processors further perform an operation of generating a network representation of mobile application behavior from an amount of directional information transfer between mobile device applications and effects of the directional information transfer obtained with the ATE measure.

* * * * *